United States Patent [19]

Viator et al.

[11] Patent Number: 4,627,922
[45] Date of Patent: Dec. 9, 1986

[54] METHOD OF REMOVING DISSOLVED OIL FROM PRODUCED WATER

[75] Inventors: C. L. Viator; Glenn E. Gilley, both of Lafayette; Paul C. Broussard, Sr., Maurice; Curtis Broussard; Dennis Gracy, both of Lafayette, all of La.

[73] Assignee: Gilley and Associates, Lafayette, La.

[21] Appl. No.: 665,741

[22] Filed: Oct. 29, 1984

[51] Int. Cl.⁴ .............................................. C02F 1/24
[52] U.S. Cl. ...................................... 210/704; 55/30; 55/45; 55/55; 134/40; 210/706; 210/708; 210/712; 210/718; 210/188; 210/218; 210/221.2
[58] Field of Search ................ 210/703–707, 210/708, 738, 718, 712, 188, 195.1, 218, 221.2; 134/40; 55/30, 45, 55

[56] References Cited

U.S. PATENT DOCUMENTS

| | | | |
|---|---|---|---|
| 2,151,248 | 3/1939 | Vaughan | 55/45 |
| 2,766,203 | 10/1956 | Brown et al. | 210/706 |
| 2,804,940 | 9/1957 | Hutchinson | 55/30 |
| 3,419,493 | 12/1968 | Pangle | 210/706 |
| 3,617,539 | 11/1971 | Grutsch et al. | 210/705 |
| 3,642,618 | 2/1972 | Silva | 210/706 |
| 3,716,480 | 2/1973 | Finley et al. | 210/202 |
| 3,967,938 | 7/1976 | Daeschler et al. | 55/30 |
| 4,094,783 | 6/1978 | Jackson | 210/703 |
| 4,216,085 | 8/1980 | Chittenden | 210/221.2 |

FOREIGN PATENT DOCUMENTS

| | | | |
|---|---|---|---|
| 54-102662 | 8/1979 | Japan | 210/703 |
| 222249 | 10/1968 | U.S.S.R. | 210/705 |

Primary Examiner—Peter Hruskoci
Attorney, Agent, or Firm—Keaty & Keaty

[57] ABSTRACT

This invention involves a process and apparatus for removing dissolved and undissolved oil and chemical additives from waste and/or produced water streams. The process involves contacting a selected gas with the produced water stream, the selected gas utilizing hydrogen bonding and dipole interactions with the contaminants to remove them from the water. The rise rate of the selected gas is accelerated by mixing natural gas with the selected attractive gas. The selected gas and natural gas are recovered by the application of vacuum to the waste stream after treatment. The selected gas is separated from the natural gas by compressing and cooling the combined gas stream, venting the majority of the natural gas stream while the selected gas is liquified, then expanding the selected gas before returning it to the flotation vessel. Means are also provided for mixing the selected and natural gases with the contaminated water stream at line pressure so that mixing is intimate and flotation is accelerated.

29 Claims, 13 Drawing Figures

METHOD OF REMOVING DISSOLVED OIL FROM PRODUCED WATER

BACKGROUND OF THE INVENTION

1. Field of the Invention

This invention concerns purification of water from produced oil streams. More particularly, it is concerned with a method for removing dissolved oils and sand contaminated with dissolved oils from that water.

2. Discussion of the Background of the Invention

Produced oil from oilwells often contains water. This water sometimes exists underground with the oil, and at other times the water is introduced into the well when formations are washed out to produce a well. It is necessary for the water to be removed from the oil, and many prior art processes have been developed to effectuate this removal.

Oil skimmers are known which can reduce the water content of the oil from a 1:1 water/oil emulsion to about five hundred parts per million (ppm) of oil. The Environmental Protection Agency, however, requires that water being discharged from an oil production facility contain only thirty ppm oil. Accordingly, additional cleaning is required.

An example of a separator system useful in reducing the oil content of the water is found in U.S. Pat. No. 4,094,783 issued to Jackson for a "Centrifugal Flotation Separator", the disclosure of which is incorporated by reference herein. This patent shows a closed cylindrical vessel with a baffle positioned inside the vessel near the top thereof, the baffle having an axial opening and wall for the upward flow of froth and gas bubbles. Contaminated liquid is introduced tangentially into the vessel so that the entering contaminated liquid, which has been mixed with air in a previous step, is circulated in a swirling motion around the inner wall of the vessel. This swirling movement provides enough residence time for the air bubbles to have an opportunity to move centripetally toward the center of the tank and rise through the axial opening in the baffle, carrying oil droplets with them. As the bubbles and droplets move through the opening in the baffle, the foam they have formed is broken and gas is released to be recycled into to the inlet liquid line. A layer of oil formed on the surface of the water can thereafter be skimmed off.

A flotation cell, such as the one shown in U.S. Pat. No. 4,094,783 patent described above, can be used to reduce the oil content of produced water. Such flotation devices are capable of removing, however, only free oil contained in the water/oil emulsion. The flotation cells using air as a flotation gas are not very useful in removing dissolved oil particles from the water.

Dissolved oil can be defined as a droplet of oil surrounded by water molecules that capture it and keep it in suspension. Dissolved oil droplets are probably, at least in part, the result of chemical additives which are introduced into the well. These chemical additives are such things as anti-corrosives having a hydrocarbon structure with an attached nitrogen group, the nitrogen atom providing extra electrons for attaching the hydrocarbon additive to the metal parts of a well structure such as a pipeline wall. The corrosion inhibitors are eventually washed off the pipeline wall and are produced with the oil. The nitrogen containing anti-corrosive molecule is then solvated by the water molecules, making them difficult to remove by conventional methods. For this reason, prior art water treatment methods have not been able to reduce the oil content of the water below about thirty parts per million.

Accordingly, it is an object of the present invention to provide a method of removing the dissolved oil to reduce oil content of the produced water to thirty parts per million or below.

SUMMARY OF THE INVENTION

The aforementioned object is achieved by mixing produced water having about five hundred parts per million of oil into a mixing tee where it is turbulently combined with a mixture of a first and second gas. The first gas has a functional group that molecularly attracts the dissolved oil particles and the second gas is buoyant enough to promote movement of bubbles containing the dissolved oil and first gas to the surface of the water from which the dissolved oil is being removed. In especially preferred embodiments, the first gas having the molecularly attractive functional group is dichlorodifluoromethane (Freon 12, Refrigerant 12) or nitrogen gas. Both dichlorodifluoromethane and nitrogen gas are capable of hydrogen bonding the dissolved oil particles, thereby competitively displacing the water molecules which are solvating the dissolved oil droplets. The second gas is, in preferred embodiments, natural gas, air or nitrogen which mixes with the bubbles of the first gas to impart greater buoyancy to them.

After the first and second gases are mixed with the produced water in the mixing tee, the water is tangentially injected into an upper zone of a cylindrical flotation cell. The tangential introduction of the water into the flotation cell produces bubbles of first gas and second gas which float to the top of the flotation tank, drawing the oil to the top. The oil is then skimmed off of the top of the water in the flotation tank through a weir, and the oil is then expelled from the flotation tank.

The first and second gas are also introduced into a bottom zone of the flotation tank, and the upwardly moving bubbles of the first and second gas contact the downwardly swirling flow of water in the flotation cell, thereby providing multiple stages of contact between the first and second gases and the water to be cleaned.

By the time the swirling water reaches the bottom of the flotation tank, it has been substantially freed of dissolved oils. The water is then transported by hydrostatic head through a vertical pipe in the flotation tank up to the top of the tank whence it is expelled from the flotation tank and introduced into a cleanser recovery vessel. The cleanser recovery vessel removes the dissolved gases (primarily the first gas) from the first gas recovery tank. The first gas is then combined with the first and second gases which are being drawn off of the flotation cell, and these first and second gases are introduced into a cleaner regeneration unit for separating the first gas and second gas from each other as well as removing moisture from the gases.

The cleaner regeneration unit comprises a first water scrubber which condenses moisture in the mixture of first gas, second gas and water which is drawn from the flotation unit. Part of the water in the gases condenses in the water scrubber and is removed, and the remaining gases are compressed to liquify any remaining water in the gases. Another water scrubber then removes the liquid phase, and the first and second gas are vented to a desiccant bed where any molecularly bound moisture is removed. The first and second gases are then vented to a heat exchanger where the temperature of the gases is reduced until one of them liquifies, and the liquid and gaseous phases are separated.

The raw water from which the dissolved oil is being removed often contains sand particles. These sand particles can be removed from the water by conveying clean water containing the sand from the bottom of the flotation tank to a sump tank unit where the water is introduced into a sump tank. Sand collects in the bottom of the sump tank to create a bed of sand. The first and second gas are introduced through a diffuser in the bottom of the sump tank to fluidize the bed of sand and contact the sand particles with the gases to remove any dissolved oil therefrom. The oil is carried to the surface of the water in the tank and is removed from the tank through a weir in an L-shaped trough at the top of the tank. The bottom of the sump tank is slanted so that the sand in the fluidized bed moves to the lower areas of the bottom whence the sand is removed for disposal.

BRIEF DESCRIPTION OF THE DRAWINGS

The details of this invention will be evident from the following description taken in conjunction with the appended drawings, in which.

DETAILED DESCRIPTION OF THE PREFERRED EMBODIMENT

In the following description of the preferred embodiment, the first gas is dichlorodifluoromethane (which is also known by the Trade Names Freon 12 or Refrigerant 12) and the second gas is natural gas. The only requirement for the first gas is that it have a functional group that molecularly attracts dissolved oil droplets. The molecular attraction between the first gas and the dissolved oil droplets appears to be in the nature of a combination of hydrogen bonds and dipole interactions. Accordingly, any gas having a fluorine, oxygen or nitrogen group should be capable of molecularly attracting the dissolved oil particles. An example of another gas which could be substituted for dichlorodifluoromethane is nitrogen gas.

Dichlorodifluoromethane (hereinafter referred to as "Freon 12" or "Freon") is especially preferred as the first gas because of its extreme affinity for hydrocarbons and its low toxicity. The Underwriter's Laboratory has given Freon 12 a rating of six on the relative life hazard scale, meaning that the gas is not harmful in amounts up to twenty percent by volume for durations of up to two hours. Furthermore, the Environmental Protection Agency has no regulations concerning the atmospheric venting of Freon 12. In addition, it has been exempted from control by many state air quality control boards. The lack of toxicity of the gas indicates that although discharges should be minimized from an economic standpoint, substantial emissions are allowable.

Although the preferred embodiment that follows specifies natural gas as the second gas, it is possible to use any gas which is equally as buoyant or more buoyant than the first gas. Natural gas is used in preferred embodiments because it is relatively inert and does not create problems with oxidation in the flotation cell, as would air. The term "natural gas", as used in this disclosure, refers to underground gas essentially made up of methane, ethane, propane and/or paraffinic hydrocarbons, along with small amounts of hydrogen sulfide, carbon dioxide, nitrogen and in some deposits, helium.

Nitrogen gas is used as the second gas in other embodiments, even when the first gas is also nitrogen. When the nitrogen is both the first gas and the second gas, this means that nitrogen alone is used without the necessity of actually mixing nitrogen with itself.

The raw water being treated by the method disclosed herein is designed for treating produced water that has already been skimmed by a pressurized skimmer operating at about 15 psig. Pressurization of the first skimmer, which is not shown in the drawings, precludes oxygen from the flotation vessel in preferred embodiments, thereby reducing corrosion and improving separation efficiency. The conventional pretreatment of raw water which precedes the method of the instant invention reduces oil content of the water to approximately 500 parts per million. An example of such a skimmer is a C-E NATCO Free Water Knockout. These knockouts comprise large pressure vessels in which gravity separation occurs.

Figure 1:
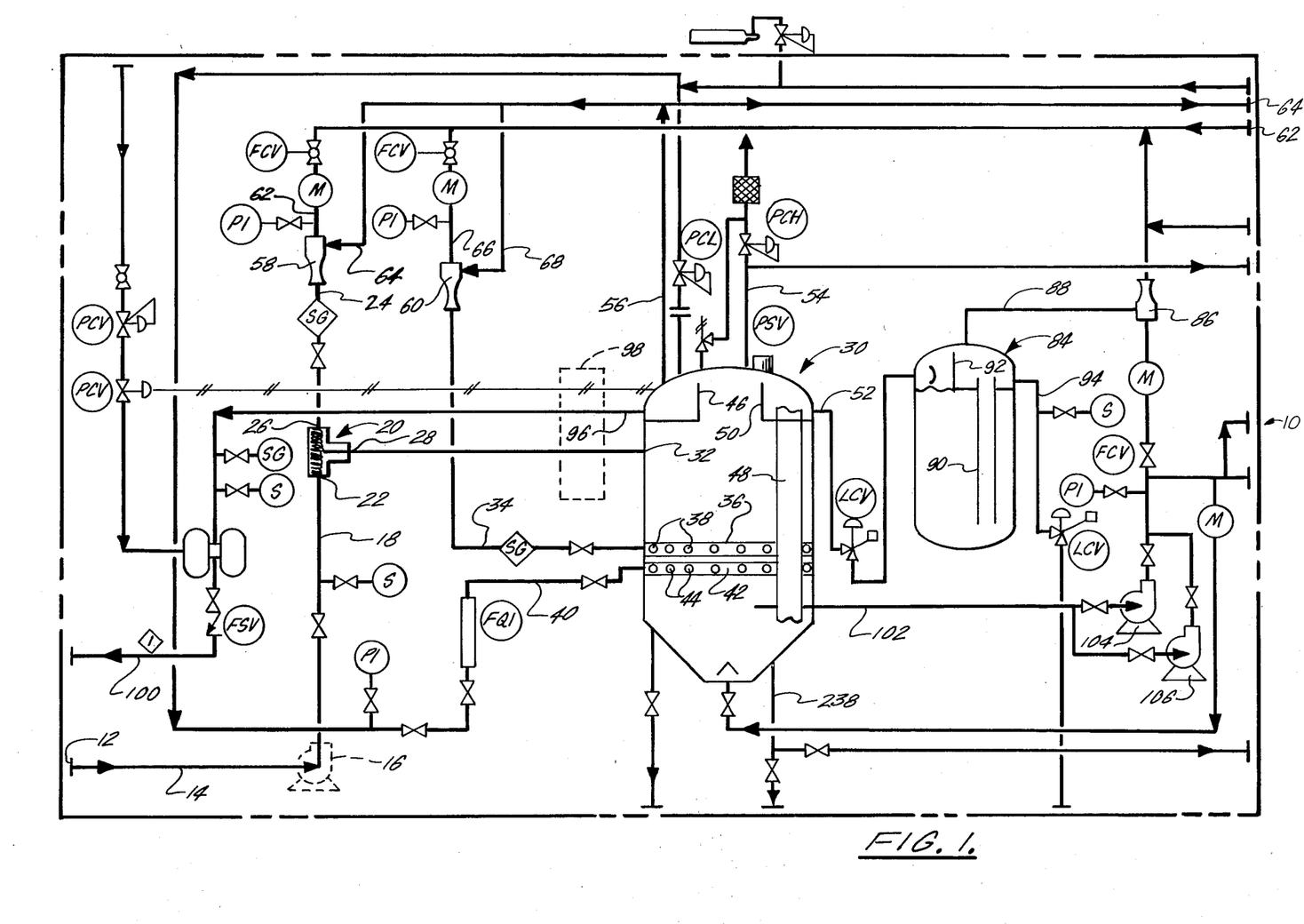
FIG. 1 is a schematic diagram of the flotation skid of the preferred embodiment wherein raw water is mixed with dichlorodifluoromethane and natural gas and injected into a cylindrical flotation tank for removal of dissolved oils from the raw water.

Raw produced water having approximately 500 to 600 parts per million of oil is introduced into flotation skid 10 at raw water inlet 12. Raw water thereafter flows through raw water line 14 to water pump 16. Although a water pump is shown in the embodiment of FIG. 1, gravity introduction of raw water into the system is often preferred as well. From water pump 16 the raw water travels through tee introduction line 18 and into mixing tee 20, the mixing tee being described below in greater detail. In preferred embodiments, about 58 gallons per minute of raw water are fed into the water inlet 22 of mixing tee 20.

A mixture of Freon 12 and natural gas is propelled through Freon and natural gas line 24 and is propelled into mixing tee 20 through Freon and natural gas inlet 26. About ten cubic feet per minute of Freon 12 and 1.38 cubic feet per minute of natural gas are introduced into mixing tee 20. A turbulent intermixing of the Freon 12, natural gas and water occurs in mixing tee 20. Inside mixing tee 20 there is a pressure drop which helps create turbulence and allow more intimate mixing of gas bubbles and oil laden raw water. At this point the Freon 12 selectively attracts solvated oil droplets to remove them from their water solvated condition. The mixed gases and water are then propelled through gas and water outlet 28 and into flotation tank 30. Introduction of the gas and water occurs at introduction port 32 where the intermixed stream of gas and water is introduced tangentially into cylindrical flotation tank 30. Immediately upon introduction of the mixture into the flotation tank, the gas bubbles laden with absorbed oils float directly to the surface of the water in flotation tank 30 to create a layer of oil on the surface. The intimate mixing of the gases and the water in mixing tee 20 and subsequent tangential introduction into flotation tank 30 results in a reduction of oil content to about 30-50 ppm.

Tangential introduction of water flow into flotation tank 30 creates a downwardly swirling flow of water. As the water is swirling downwardly, it is contacted once more with a mixture of Freon 12 and natural gas which is injected through Freon and natural gas line 34 into a diffuser 36. Diffuser 36 is, in preferred embodiments, a pipe having introduction nozzles 38 for introducing Freon 12 and natural gas substantially horizontally into flotation tank 30. In especially preferred embodiments, nozzles 38 are oriented at approximately a 15° angle to the horizontal to impart an upward component of movement to the Freon 12 and natural gas being introduced through nozzles 38 of diffuser 36. As Freon 12 and natural gas bubbles pass upwardly through the swirling flow of water in flotation tank 30, multistages of contact occur between the bubbles and water as the swirling flow passes downwardly in flotation tank 30. These multistages of contact between the bubbles and water almost completely remove the remaining dissolved oil from the water in flotation tank 30.

In some embodiments, pure Freon 12 is introduced through Freon introduction line 40 into flotation tank 30 where it is distributed through Freon diffuser 42 having Freon nozzles 44 through which the Freon is dispelled from diffuser 42. Introduction of Freon 12 bubbles at this point can replenish any Freon being lost from the system as well as providing additional removal of dissolved oil from water as the freon bubbles float to the top of flotation tank 30.

Oil collected on the surface of the water in flotation tank 30 is skimmed off of the surface of the water through a trough 46, which is described in greater detail below. Clean water from the bottom zone of flotation tank 30 is forced by hydrostatic head through clean water conduit 48 up into clean water removal trough 50, whence clean water is removed from flotation tank 30 through clean water discharge line 52. Water is removed from clean water removal trough 50 by means of a Level Control Valve LCV when the level of water in clean water removal trough 50 reaches a preselected level.

Freon 12 and natural gas saturated with water are removed through line 54 for separation into the individual components in the cleaner regeneration skid to be described below. Freon 12 and natural gas is also removed through line 56 for recycling into mixing tee 20. Freon 12 and natural gas is drawn through line 56 by means of jet pumps 58, 60 which are described in greater detail below. p Briefly, jet pumps 58, 60 each comprise a venturi into which fluid under pressure is introduced to create at least a partial vacuum, the vacuum being used to draw fluid from another source into the jet pump where the fluids are mixed and propelled. For example, gases are introduced into jet pump 58 through line 62 to help create a vacuum in jet pump 58. The vacuum thereby created draws Freon 12 and natural gas being recycled through line 64, whence the Freon and natural gas mixture is propelled to mixing tee 20 for turbulent agitation with the raw water.

Similarly, Freon 12 is introduced through line 66 into jet pump 60 to create at least a partial vaccum for drawing Freon 12 and natural gas from flotation cell 30 through line 56 for introduction into jet pump 60 through line 68.

Figure 13:
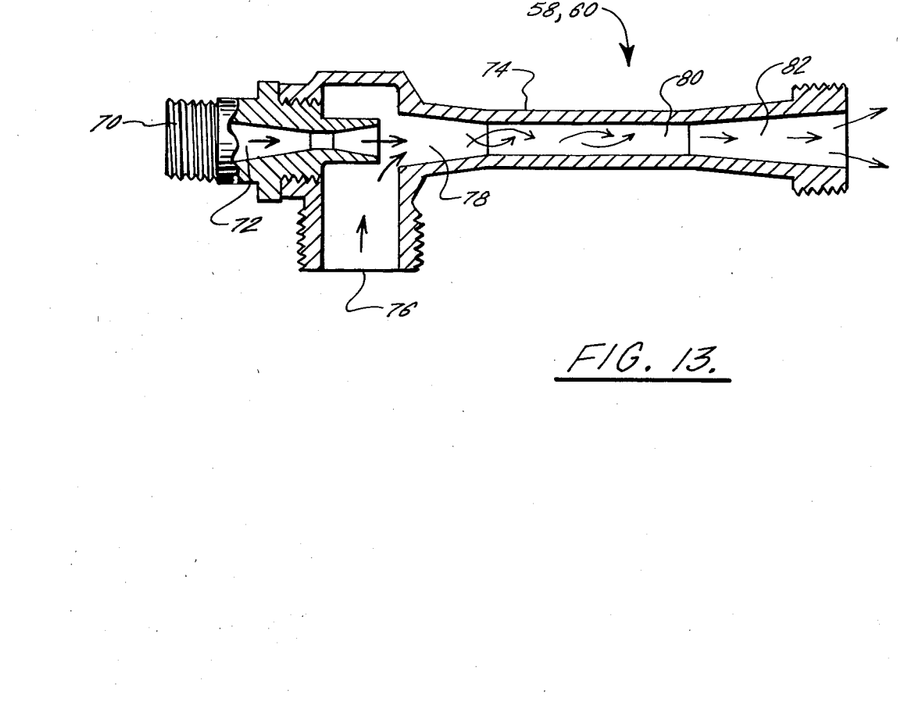
FIG. 13 is a view of one of the jet pumps used in the present invention, the pump being shown partially in cross-section for purposes of clarity, the movement of fluids through the pump being shown with arrows.

Jet pumps 58, 60 are identical in structure and are shown in greater detail in FIG. 13 which shows jet pumps 58, 60 in cross-section. Each jet pump is comprised of an introduction passageway 70 which is in fluid communicating relationship with a venturi 72. The fluid introduced flows through venturi 72 and into mixing segment 74. The passage of fluid through venturi 72 creates a vacuum which draws fluid through passage 76, and the fluid drawn through passage 76 mixes with the fluid passing through venturi 72 in mixing segment 74. Mixing segment 74 is comprised of a first, larger diameter section 78, second, reduced diameter section 80 and third enlarged diameter section 82. Constriction of the diameter of the passageway in first section 78 brings the fluid flowing through venturi 72 and passage 76 into more intimate contact, and creates a turbulent flow in the narrow second section 80, the turbulent flow promoting mixing of the fluids. The enlarged diameter of third section 82 permits the gases to expand once again, reducing turbulent flow before the gases leave the jet pump 58 or 60.

Clean water which is discharged through clean water discharge line 52 is next taken to Freon recovery tank 84 where pressure in the tank is reduced by means of a jet pump 86 to reduce the solubility of Freon 12 in water and remove it from Freon recovery tank 84 through freon recovery line 88. Water is removed from Freon recovery tank 84 by movement of clean water up through clean water conduit 90 and into trough 92 under the force of hydrostatic head in Freon recovery tank 84. Clean water is then discharged through clean water discharge line 94. Clean water can be discharged to the environment in accordance with EPA regulations now that it is substantially cleaned of dissolved oil droplets.

The oil which has been carried to the surface of the water in flotation tank 30 and which is collected in trough 46 is discharged from flotation tank 30 through skimmed oil line 96. This skimmed oil is conveyed to another Freon recovery unit 98 which is similar to Freon recovery unit 84, the primary difference being that Freon 12 is being removed from oil instead of water. The pressure in Freon recovery unit 98 is reduced in a fashion similar to the reduction of pressure in freon recovery tank 84, thereby reducing the solubility of Freon 12 in the oil and drawing the Freon out of the oil so that the oil can be sent through skimmed oil discharge 100 and returned to the process stream.

Clean water can also be removed through clean water line 102 adjacent the bottom of flotation tank 130, the water moving through line 102 to a water pump 104 and backup pump 106 for recirculation in the system.

Figure 4:
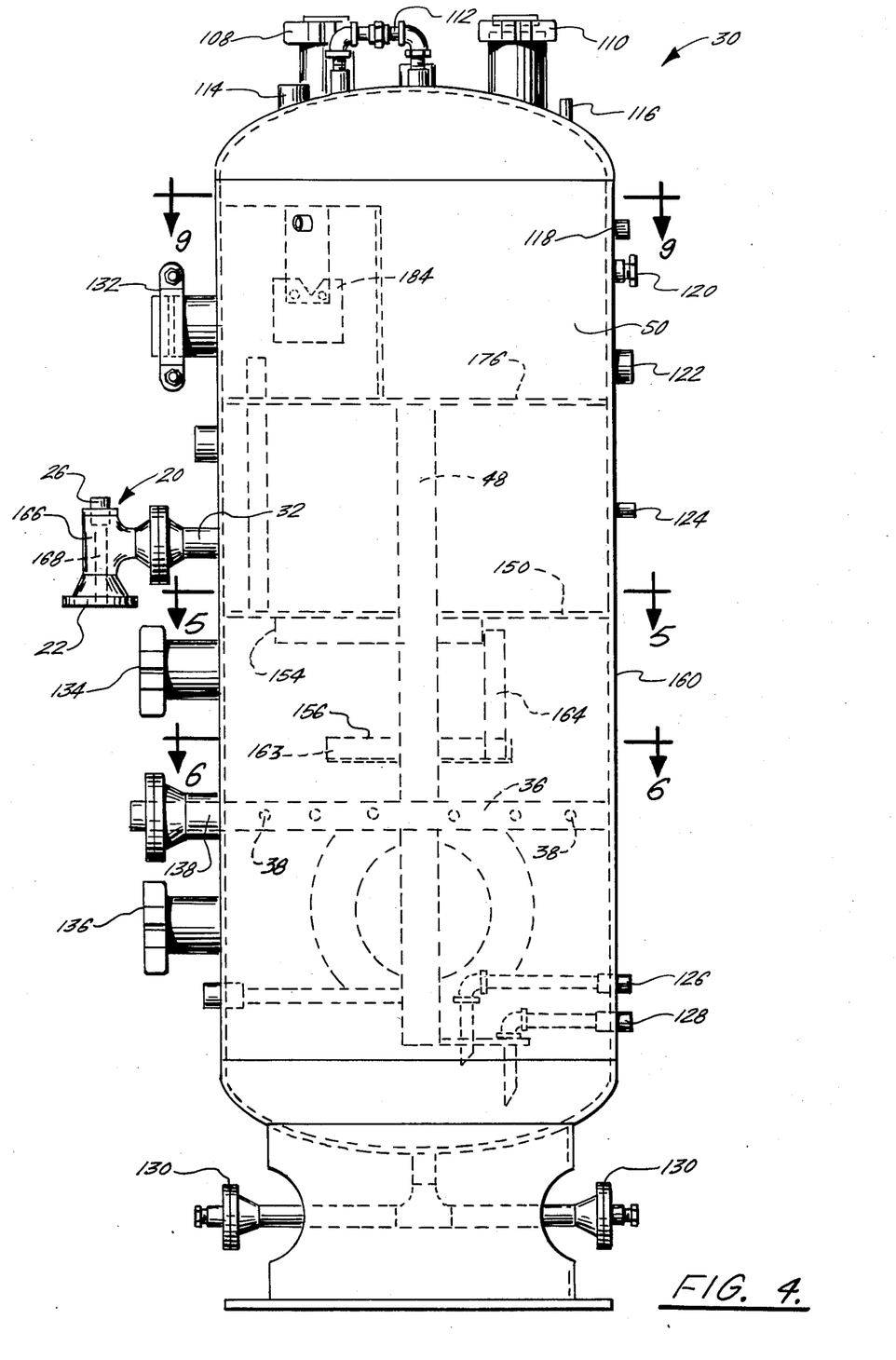
FIG. 4 is a side elevational view of the flotation tank schematically shown in FIG. 1, the internal parts of the flotation tank being shown in phantom.

The preferred embodiment of flotation tank 30 is shown in greater detail in FIG. 4. Externally, tank 30 is provided on its top with two access ports 108, 110 through which access may be had to the interior of the tank. A pressure equalization tube 112 is provided to help equalize pressure in the tank, the tank being pressurized to between one and three psig. Freon and gas recycle coupling 114 is provided for connection to line 56, and pressure gauge 116 is shown at the upper right hand side of the top of tank 30.

On the outside of the right sidewall of tank 30 a level safety device is shown which shuts down operation of flotation skid 10 when water in flotation tank 30 reaches a dangerously high level. Water level controller 120 is shown above water outlet 122. Clean water is discharged through water outlet 122, this outlet 122 being coupled to clean water discharge line 52 shown in FIG. 1.

A temperature gauge 124 can also be provided on the tank to monitor temperature, and sample points 126, 128 can also provide means for withdrawing water from flotation tank 30 to determine if dissolved oil is being properly removed from the raw water. Drain 130 is shown at the bottom of flotation tank 30, and drain 130 is normally closed when flotation skid 10 is in operation.

On the left hand side wall of flotation tank 30, an oil level controller 132 is shown for removing oil from trough 46 when the oil reaches a preselected level. Mixing tee 20 is shown attached adjacent flotation tank 30, and being connected to tank 30 by introduction port 32.

Two inspection ports 134, 136 are also provided through which the interior of flotation tank 30 can be inspected when the flotation skid is shut down.

Flotation tank 30 is also provided with Freon and natural gas inlet 138 which is coupled to line 34 shown in FIG. 1.

Freon diffuser 42 is not shown in the view of flotation tank 30 in FIG. 4 since it is optional and not essential to an understanding of the invention or its operation.

Water from mixing tee 20 is tangentially introduced into flotation tank 30 to initiate the swirling, downward flow of water in cylindrical flotation tank 30. An upper baffle 150 (FIGS. 4 and 5) comprises a substantially circular plate affixed to the walls of flotation tank 30 and having a central opening 152. The central opening 152 is bounded by a downwardly depending flange 154 which, in preferred embodiments, is about 4 inches wide. Flange 154 circumscribes the entire perimeter of central opening 152 and helps retain bubbles underneath the solid portion of upper baffle 150.

A lower baffle 156 (FIGS. 4 and 6) comprises a substantially circular plate having a central axis coincident with the central axis of upright, cylindrical flotation tank 30. Lower baffle 156 is of a lesser diameter than the diameter of cylindrical flotation tank 130 so that an annular opening 158 is defined between the periphery of lower baffle 156 and the sidewalls 160 of flotation tank 30. Lower baffle 156 is provided with a downwardly depending flange 163 around the circumference of lower baffle 156 to provide a means for retaining bubbles produced below lower baffle 156 underneath lower baffle 156. The radius of lower baffle 156 is approximately as great as the greatest radii of central opening 152 of upper baffle 150.

Figure 5:
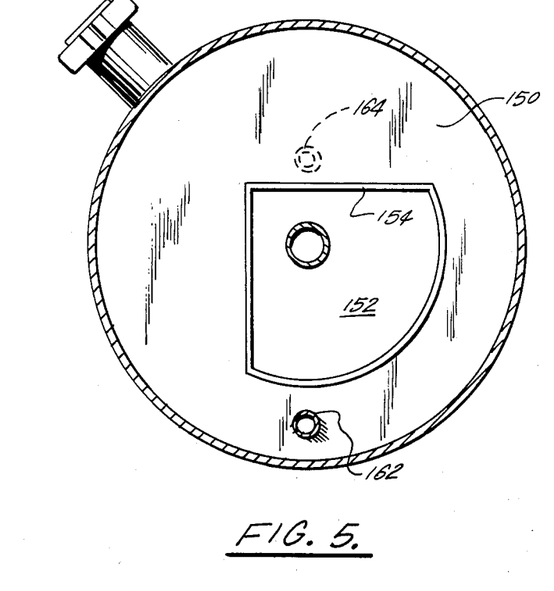
FIG. 5 is a cross-sectional view along section line 5—5 in FIG. 4 showing the upper baffle.
Figures 6, 8:
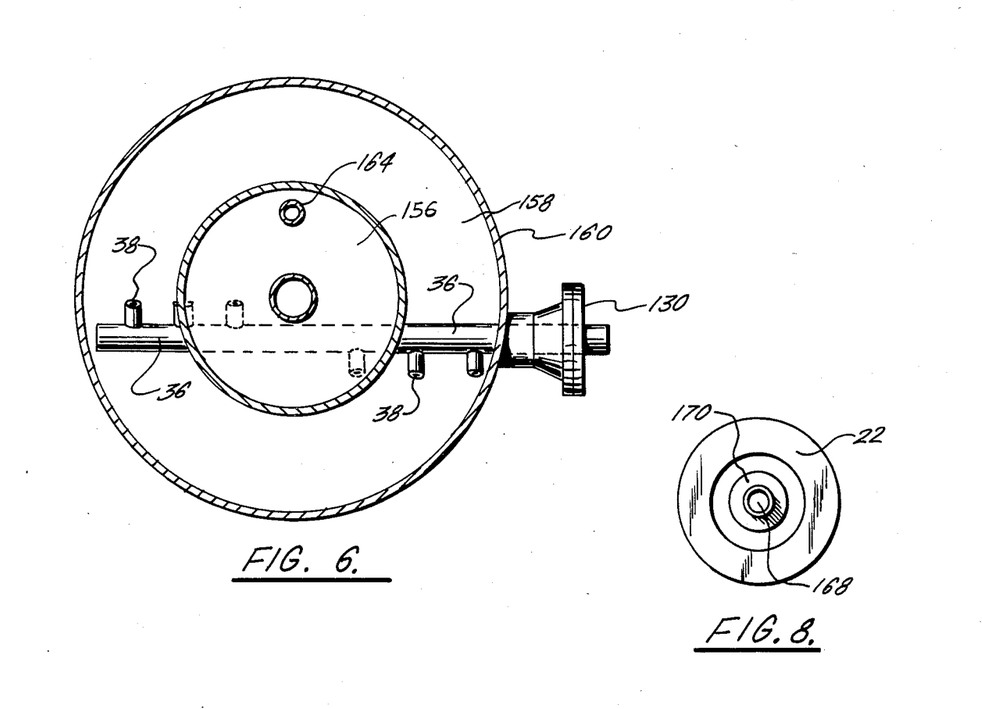
FIG. 6 is a cross sectional view along section line 6—6 in FIG. 4 showing the lower baffle.
FIG. 8 is a view taken along lines 8—8 in FIG. 7.

Upper and lower baffles 150, 156 promote the circular movement of water through flotation tank 30 and prevent water from moving too quickly to the bottom of flotation tank 30 under the influence of gravity.

A first vent 162 is mounted on upper baffle 150 and is in fluid communicating relationship with the region beneath upper baffle 150 which retains bubbles. The purpose of first vent 162 is to convey these bubbles from beneath upper baffle 150 to a position adjacent the surface of the water in flotation tank 30. Movement of bubbles through first vent 162 allows bubbles to move upwardly against the force of the downward velocity of water being tangentially introduced into flotation tank 30. Similarly, lower baffle 156 is provided with a second vent 164 which communicates with the enclosed area beneath lower baffle 156 to provide a means for moving bubbles produced by the diffuser 36 from beneath circular lower baffle 156 to the protected, flange enclosed area beneath the solid portion of upper baffle 150. The circular swirl of water then moves bubbles underneath baffle 150 to the area adjacent first vent 162, and bubbles are then conveyed to an area adjacent the surface of the water in flotation tank 30 through first vent 162.

Figure 7:
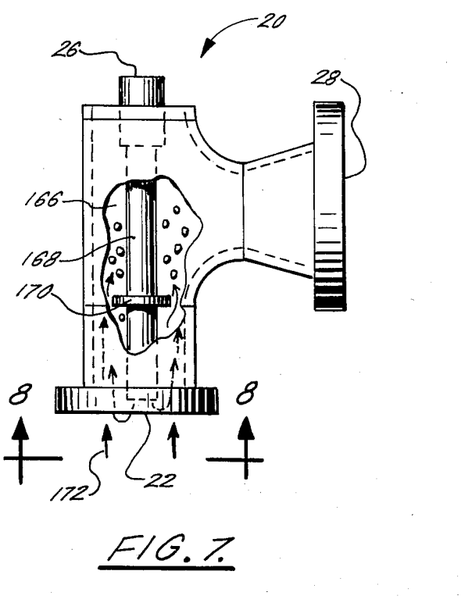
FIG. 7 is a side view of the mixing tee, parts of the wall of the mixing tee being broken away for clarity to expose an internal conduit, parts of the conduit being shown in phantom.

Turning now in detail to FIG. 7, a mixing tee 20 is shown in which the Freon 12, natural gas and raw water are intimately mixed to form bubbles of Freon 12 and natural gas. Raw water is entering through first tee introduction line 18 and moves through water inlet 22 for introduction into mixing tee 20. Freon 12 and natural gas are entering mixing tee 20 through Freon and natural gas inlet 26, and the Freon 12 and natural gas are thence conveyed through chamber 166 in conduit 168 which terminates in an open end adjacent water inlet 22. An annular flange 170 is provided around conduit 168 to reduce the open area through which water and gas may flow. As Freon and natural gas are introduced through conduit 168 and water is introduced in the direction of arrow 172 at water inlet 22, a turbulent counterflow of water with the Freon 12 and natural gas is created which encourages mixing of the gases and water. Annular flange 170 constricts the area through which the gases and water may move, and this constriction, followed by expansion in chamber 166, increases the turbulent flow and promotes formation of bubbles which are then tangentially introduced into flotation tank 30.

Figure 9:
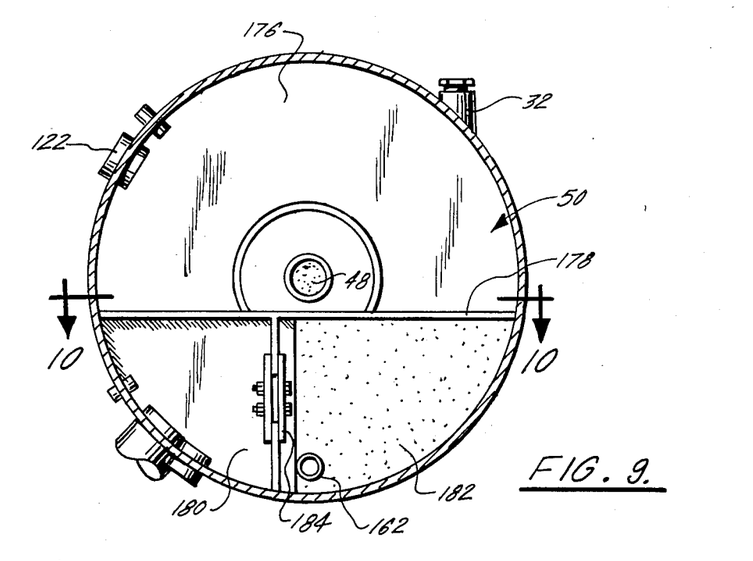
FIG. 9 is a cross-sectional view of the top of the flotation tank taken along section lines 9—9 in FIG. 4.
Figure 10:
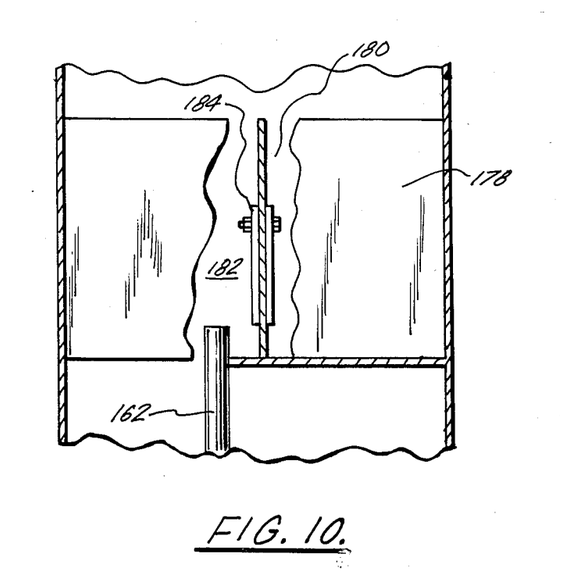
FIG. 10 is a view taken along lines 10—10 in FIG. 9, parts of a partition being broken away to reveal the adjustable weir.
Figure 11:
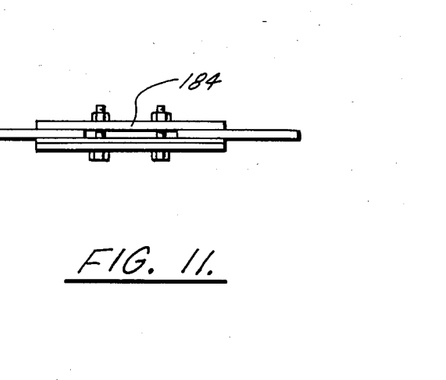
FIG. 11 is a top view of the adjustable weir shown in FIG. 10.

FIGS. 9-11 show in greater detail the arrangement of troughs and partitions at the top of flotation tank 30. A horizontal, substantially semi-circular partition 176 is provided for separating clean water removal trough 50 from the region of the tank beneath partition 176. A vertical partition 178 separates trough 50 from l-shaped trough 46 (FIG. 1) which is comprised of oil bucket 180 and bubble chamber 182. First vent 162 can be seen in bubble chamber 182, and the bubbles from beneath upper baffle 150 are conveyed through first vent 162 to bubble chamber 182 where they deposit oil droplets which they have molecularly attracted and bound. Similarly, bubbles introduced through introduction port 32 from mixing tee 20 also float through the open bottom of bubble chamber 182 and carry dissolved oil particles to the surface of that water, forming an oil layer thereon. The oil layer is then skimmed off through adjustable weir 184 and into oil bucket 180 whence it is removed from flotation tank 30 through skimmed oil line 96.

The chamber defined by semi-circular, horizontal partition 176 and vertical partition 178 is clean water removal trough 50 (FIG. 1). Clean water is conveyed by hydrostatic head through clean water conduit 48 from the bottom of flotation tank 30, where the water is in a clean condition, up through flotation tank 30 and into clean water removal trough 50, whence it is removed through water outlet 122 into clean water discharge line 52.

Figure 2:
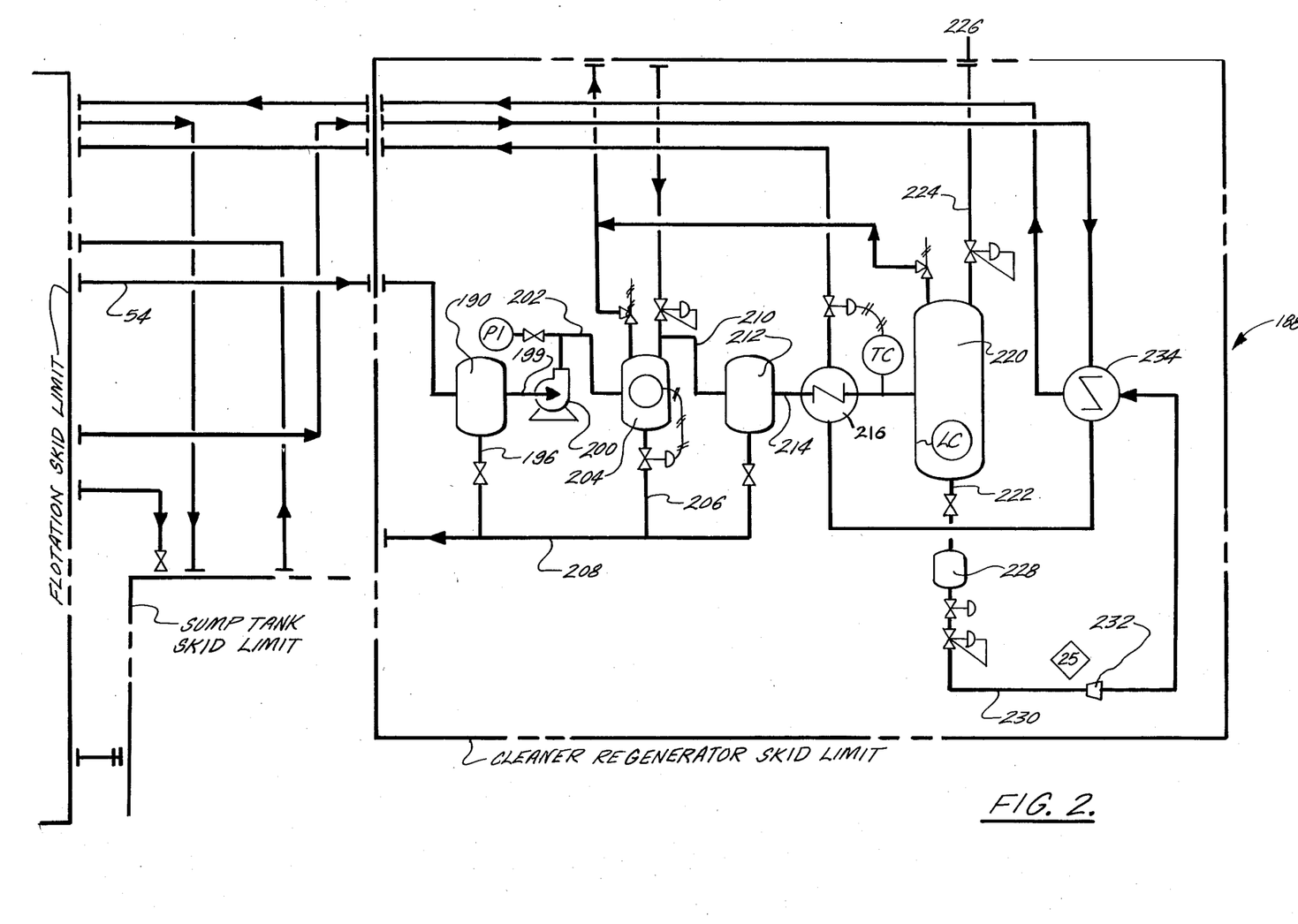
FIG. 2 is a schematic diagram of the cleaner regeneration skid wherein Freon and natural gas, which are saturated with water vapor, are separated into the separate components of Freon, natural gas and water for purposes of recycling the Freon and natural gas.

Turning now to FIG. 2, a cleaner regenerator skid 188 is shown wherein Freon 12 and natural gas saturated with water is separated once again into its water, Freon and natural gas components.

Figure 12:
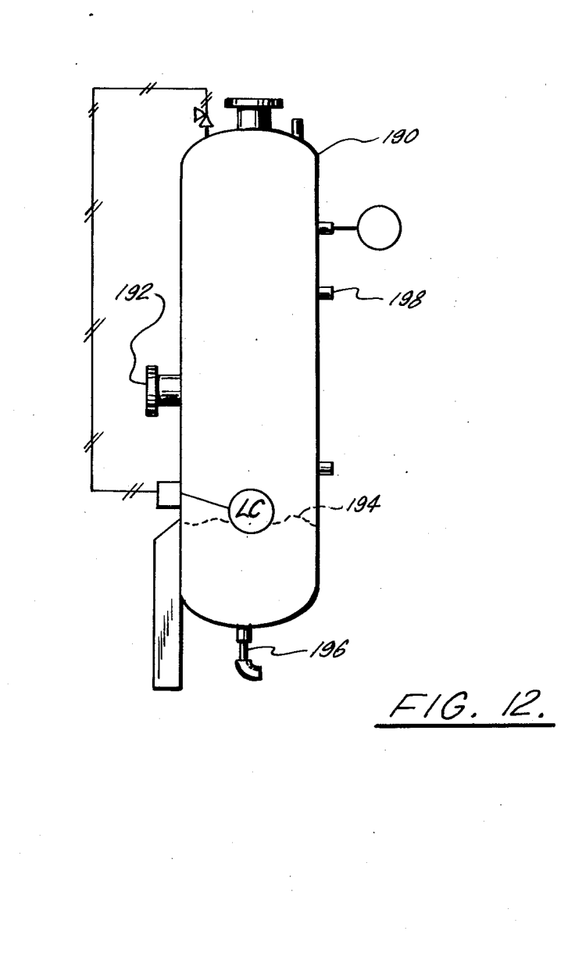
FIG. 12 is a side view of a water scrubber in the regeneration skid, a water level being shown in phantom.

The Freon 12 is removed with natural gas and entrained moisture through line 54 through which it is conveyed to cleaner regeneration skid 188. The Freon 12, natural gas and water are introduced into a first water scrubber 190, which is shown in greater detail in FIG. 12. The pressure inside water scrubber 190 is maintained at approximately 2 psig, and water is introduced tangentially from line 54 into water scrubber inlet 192. Introduction of the gases and entrained moisture tangentially into first water scrubber 190 creates a centrifugal water scrubber for free water knockout, water vapor condensing on the sides of first water scrubber 190 as it swirls down. As the water accumulates in the bottom of the tank (a water level being shown at 194), a level control valve LC releases water from the tank through water scrubber outlet 196. The remaining Freon 12 and natural gas is vented out of, for example, gas outlet 198, and the gas is then conveyed through line 199 to a compressor 200 where the pressure on the gas is increased to 150 psig, thereby liquifying any remaining water in the Freon and natural gas mixture. The Freon and natural gas with the now liquid water passes through line 202 and into a second water scrubber 204 which is substantially identical to first water scrubber 190. Tangential introduction of the gases and water once again knocks out free water which is removed through line 206 for discharge into oily water line 208. The remaining Freon and natural gas are then vented through line 210 into desiccant bed 212 containing, for example, a silica gel desiccant to remove any water which may be molecularly bound to the Freon 12 and natural gas. The Freon 12 and natural gas, now free of all free water and molecularly bound water, moves through line 214 to a heat exchanger 216 where the temperature of the gases is reduced from about 180° to about 120°, thereby liquifying the gaseous Freon 12. The natural gas and Freon 12 next move through line 218 into a third scrubber 220 which is substantially similar to scrubbers 190 and 212. The liquid Freon 12 and natural gas are tangentially introduced into third scrubber 220, thereby condensing liquid Freon 12 on the sides of third scrubber 220 so that the liquid accumulates at the bottom of third scrubber 220 and is removed through line 222 when level control valve (LC) indicates that the Freon 12 has reached a predetermined level. Natural gas is then vented out of the top of third scrubber 220 through line 224 to an LP vent 226.

Liquid Freon 12 moving through line 222 is next passed through an activated charcoal bed 228 to remove any propane, butane and pentane or any other gases which act like the Freon 12 and leave with it through line 222. After leaving the activated charcoal bed 228, liquid Freon 12 passes through line 230 and into expansion valve 232 where the liquid Freon 12 at 150 psig is expanded to 30 psig and undergoes a phase change from liquid to gaseous. The cooling produced as a result of the expansion is used in heat exchanger 234 to help cool produced water.

Figure 3:
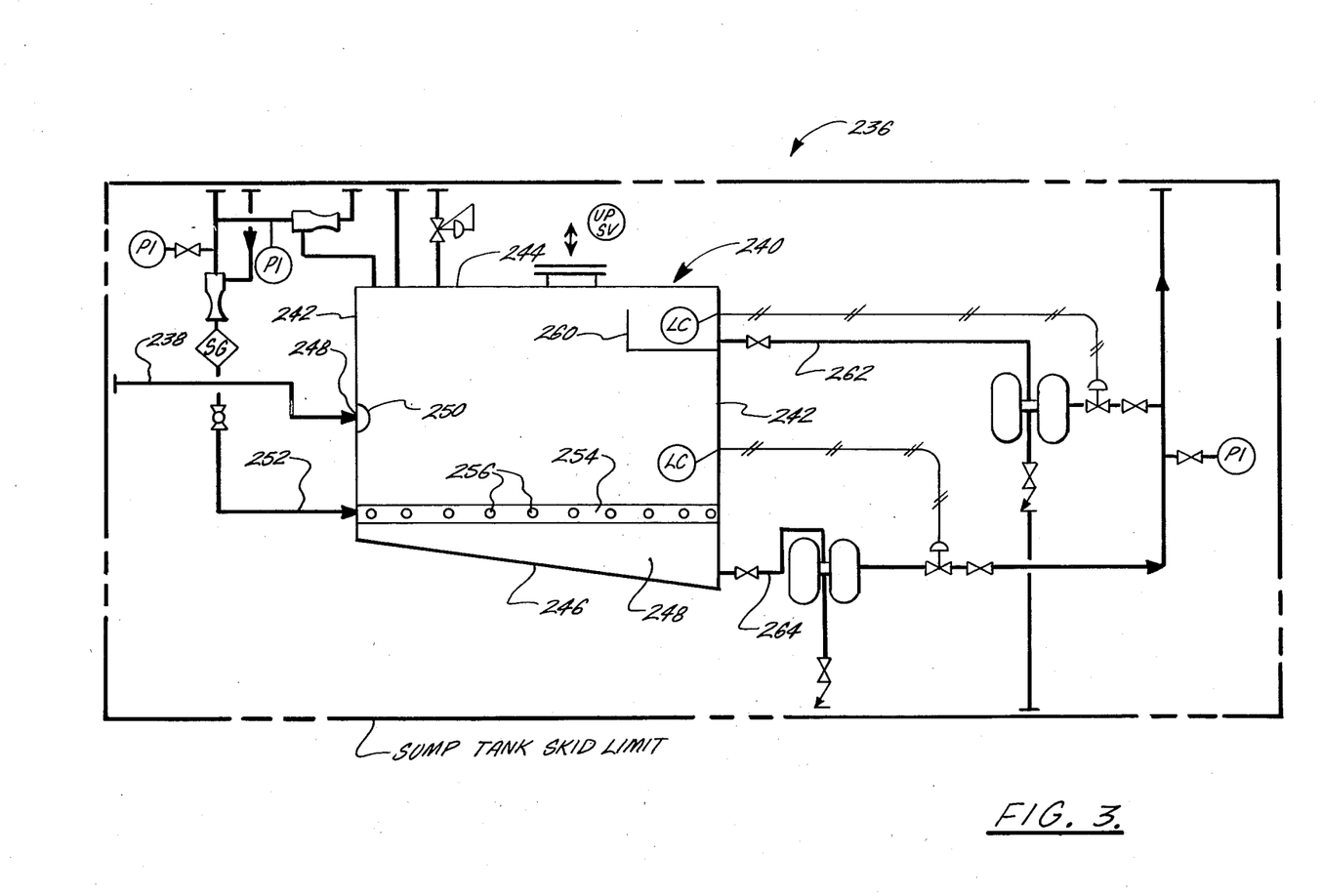
FIG. 3 is a schematic view of the sump tank skid which cleanses sand removed from the flotation tank skid.

Turning now to FIG. 3, a sump tank skid 236 is shown. It sometimes happens that raw water being processed in floatation tank 30 contains a high content of sand. Such sand moves to the bottom of floatation tank 30 whence it is removed through sand removal line 238 and is conveyed to sump tank 240. Sump tank 240 is substantially trapezoidal in cross-section, having upright sidewalls 242, a flat top 244 and a slanted bottom 246. The slanted bottom 246 of sump tank 240 provides a lower region 248 to which sand in the tank moves.

Sand and water move through line 238 and are introduced into sump tank 240 at sand and water inlet 248. On the interior of sump tank 240 adjacent sand and water inlet 248 is a deflector baffle 250 which prevents sand and water from being directed at the walls of sump tank 240 as it enters the tank.

Freon 12 and natural gas which are recovered from floatation tank 30 are injected through line diffuser 254 (which is similar in structure and function to diffuser 36 described above). Diffuser 254 is provided with nozzles 256 through which Freon 12 and natural gas are introduced into sump tank 240. As bubbles of natural gas and Freon 12 pass through nozzles 256, the two gases come into contact with sand which is covered by dissolved oils and other oils. As the bubbles pass by the sand particles, a fluidized bed of sand is created and the bubbles remove oil from the sand particles and float the oil to the surface of water contained in sump tank 240. Oil on the surface of the water is skimmed off in oil trough 260, and when the level of oil in trough 260 reaches a predetermined level the level control valve LC allows the oil to be removed through line 262 for return to the well stream or for further processing.

Cleaned sand is removed through line 264 and is expelled to a sump caisson (not shown).

While the invention has been described with a certain degree of particularity, it is manifest that many changes can be made in the details of construction and the arrangement of components. It is understood that the invention is not to be limited to specific embodiments set forth herein by way of exemplifying the invention, but the invention is to limited only by the scope of the attached claim or claims, including the full range of equivalency to which each element or step thereof is entitled.

We claim:

1. A method of removing dissolved oil from water, the dissolved oil being comprised of hydrocarbon additives solvated by water molecules, the hydrocarbon additives having a hydrocarbon structure with an attached group for providing extra electrons for attaching the hydrocarbon additive to metal, the method comprising the steps of:
    turbulently contacting a first gas comprising dichlorodifluoromethane with the water to create bubbles that move dissolved oil particles to a surface of the water, the first gas comprising an effective amount of dichlorodifluoromethane to molecularly attract the dissolved oil particles through hydrogen bonding, and preferentially displace solvating water molecules, and removing the dissolved oil from the surface.

2. The method of claim 1 further comprising the step of mixing a second gas with the first gas, the second gas being sufficiently buoyant to promote movement of bubbles to the surface of the water from which dissolved oil is being removed.

3. The method of claim 2 wherein the second gas is selected from the group consisting of natural gas, air and nitrogen.

4. The method of claim 1 further comprising the step of introducing the water into a flotation tank having an upper region and a lower region after the water is contacted with the first and second gases, the water being introduced into the upper region of the flotation tank tangentially to create a circular downward flow toward the lower region.

5. The method of claim 4 further comprising the step of also introducing the first gas into the flotation tank at the lower region which is below the level at which the water is tangentially introduced into the flotation tank to further remove dissolved oil from the water, the first gas being introduced at the lower level such that the gas introduced at the lower level contacts the circularly flowing water as the gas rises.

6. The method of claim 5 further comprising the step of mixing a second gas with the first gas, the second gas being more buoyant than the first gas to promote movement of bubbles of the first gas to the surface of the water from which dissolved oil is being removed.

7. The method of claim 6 further comprising the step of removing water from the flotation tank and introducing the water into a vacuum vessel to cause a liberation of a major portion of the first and second gases dissolved in the water.

8. The method of claim 7 further comprising the step of contacting the gases liberated in the vacuum vessel with a desiccant.

9. The method of claim 7 further comprising the step of reducing the temperature of the gases liberated in the vacuum vessel until one of the gases liquifies, then separating the liquid and gaseous phases.

10. The method of claim 5 further comprising the step of removing dissolved oils from particulate matter contained in the water in the flotation tank, the removal comprising the step of:
  introducing the water and particulate matter into a sump tank where the particulate matter accumulates on the bottom of the sump tank; and
  contacting the first gas with the particulate matter to remove dissolved oil from the particulate matter and float the dissolved oil to the surface of the water in the sump tank.

11. The method of claim 10 wherein oil floated to the surface of the water in the sump tank is skimmed from the surface of the water and removed from the sump tank.

12. The method of claim 11 wherein the bottom of the sump tank is slanted to provide a bottom having a lower portion area, and removing particulate matter from the sump tank through an outlet at the lower portion area of the sump tank.

13. The method of claim 5 wherein the flotation tank is provided with means for promoting the circular flow of water through the flotation tank.

14. The method of claim 13 wherein the means for promoting circular flow is a first baffle substantially horizontally disposed in the interior of the tank between a level at which the water is tangentially introduced into the flotation tank and a lower level at which the first and second gases are introduced into the flotation tank at a level below the level at which the water is tangentially introduced into the flotation tank.

15. The method of claim 14 wherein the means for promoting circular flow is further comprised of a second baffle plate substantially horizontally disposed in the flotation tank between the first baffle and the lower level, each of the baffles extending only partially across the tank.

16. The method of claim 15 wherein the first baffle is a plate having a central opening through which water flows downwardly and the second baffle is a plate having a substantially annular opening through which water flows downwardly.

17. The method of claim 16 wherein the second baffle is provided with means for retaining beneath it bubbles created by the introduction of the first and second gases into the flotation tank at the lower level and said first baffle is provided with means for retaining beneath it bubbles created by the introduction of the first and second gases into the flotation tank at the lower level, the first baffle being provided with a first vent for venting bubbles from beneath the first baffle to a position adjacent the surface of the water in the flotation tank, the second baffle being provided with a vent for venting bubbles from beneath the second baffle to a position adjacent the underside of said first baffle.

18. The method of claim 1 wherein the first gas is mixed with the water in a mixing tee, said tee comprising:
  a chamber having a water inlet for the water, a gas inlet for the first gas, and an outlet through which the water and gas mixture is discharged, the gas being introduced through a conduit that terminates adjacent the water inlet and propels gas against the inward flow of the water to create a counter flow of water and first gas, thereby enhancing the formation of bubbles in the chamber.

19. The method of claim 18 wherein an annular constriction is provided around the exterior of the conduit between the conduit's termination adjacent the water inlet and the remainder of the chamber.

20. The method of claim 19 wherein a second gas is contacted with the water by introducing the second gas through the conduit with the first gas, the second gas being sufficiently buoyant to promote movement of bubbles to a surface of the water from which dissolved oil is being removed.

21. The method of claim 20 wherein the second gas is selected from the group consisting of natural gas, air and nitrogen.

22. The method of claim 1 wherein said hydrocarbon additives are corrosion resistance additives.

23. The method of claim 22 wherein said corrosion resistance additives contain a nitrogen functional group.

24. A method of removing dissolved oil from water, the dissolved oil being comprised of hydrocarbon additives solvated by water molecules, the hydrocarbon additives having a hydrocarbon structure with an attached group for providing extra electrons for attaching the hydrocarbon additive to metal, the method comprising the steps of:
  turbulently contacting a first gas comprising dichlorodifluoromethane and a second gas with the water, the first gas comprising an effective amount of dichlorodifluoromethane to molecularly attract the dissolved oil particles through hydrogen bonding and dipole interactions, the second gas being sufficiently buoyant to promote movement of bubbles of the first gas to a surface of the water from which dissolved oil is being removed;

the turbulent contacting occurring in a mixing tee to create bubbles that move dissolved oil particles to the surface of the water, the mixing tee comprising a chamber having a water inlet for the water, a gas inlet for the first and second gases, and an outlet through which the water and gas mixture is discharged, the gases being introduced through a conduit having a smaller diameter than the diameter of the water inlet, the conduit terminating adjacent the water inlet and propelling the gases against the inward flow of the water to create a counterflow of water and gas that enhances formation of bubbles in the chamber, an annular constriction being provided around the exterior of the conduit between the conduit's termination adjacent the water inlet and the remainder of the chamber;

introducing the contacted water and gases tangentially into a flotation tank having an upper region and a lower region to create a circular flow therein;

introducing the first and second gases into the flotation tank at the lower region which is below the level at which the water is tangentially introduced into the flotation tank;

providing the flotation tank with an upper baffle and a lower baffle, both of which are substantially horizontally disposed in the interior of the tank between a level at which the water is tangentially introduced into the flotation tank and the lower region, the upper baffle having a central opening through which water flows downwardly and the second baffle being a substantially circular plate surrounded by a substantially annular opening through which water flows downwardly in the flotation tank, the lower baffle being provided with means for retaining beneath it bubbles created by the introduction of the first and second gases into the flotation tank at the lower level, and the upper baffle being provided with means for retaining beneath it bubbles created by the introduction of the first and second gases into the flotation tank at the lower level, the upper baffle being provided with an upper vent for venting bubbles from beneath the upper baffle to a position adjacent the surface of the water in the flotation tank, the lower baffle being provided with a lower vent for venting bubbles from beneath the lower baffle to a position adjacent the underside of the upper baffle and removing dissolved oil from said surface.

25. The method of claim 24 wherein the second gas is selected from the group consisting of natural gas, air and nitrogen.

26. The method of claim 24 wherein the dissolved oil is comprised of corrosion resistance additives containing a nitrogen functional group.

27. A method of removing dissolved oil from particulate matter contained in water, the dissolved oil being comprised of hydrocarbon additives solvated by water, the hydrocarbon additives having a hydrocarbon structure with an attached group for providing extra electrons for attaching the hydrocarbon additive to metal, the method comprising the steps of:

introducing the water containing the particulate matter into a sump tank where the particulate matter accumulates on the bottom;

introducing a gas comprising dichlorodifluoromethane into the sump tank and contacting it with the particulate matter, the gas comprising an effective amount of dichlorodifluoromethane to molecularly attract the dissolved oil particles through hydrogen bonding and dipole interactions, the gas promoting movement of the oil particles to a surface of the water in the sump tank; and skimming oil from the surface of the water.

28. The method of claim 27 wherein a more buoyant second gas is added to the gas introduced into the sump tank, the second gas being selected from the group consisting of natural gas, air and nitrogen.

29. A method of removing dissolved oil from water and sand contained in produced water having dissolved oil particles contained therein, the method comprising the steps of:

mixing a first and second gas, the first gas being selected from the group consisting of nitrogen and dichlorodifluoromethane, the second gas being selected from the group consisting of natural gas, air and nitrogen;

contacting in a mixing tee the first and second gases with water to create bubbles that move dissolved oil particles to the surface of the water, an effective amount of the first gas being added to attract the dissolved oil particles through hydrogen bonding and preferentially displace solvating water molecules, the mixing tee comprising a chamber having a water inlet for the water, a gas inlet for the first and second gases, and an outlet through which the water and gas mixture is discharged, the gases being introduced through a conduit having a smaller diameter than the diameter of the water inlet, the conduit terminating adjacent the water inlet and propelling the gases against the inward flow of the water to create a counterflow of water and gas that enhances formation of bubbles in the chamber, an annular constriction being provided around the exterior of the conduit between the conduit's termination adjacent the water inlet and the remainder of the chamber;

introducing the contacted water and gases tangentially into a flotation tank to create a circular flow therein;

introducing the first and second gases into the flotation tank at a lower level which is below the level at which the water is tangentially introduced into the flotation tank;

providing the flotation tank with an upper baffle and a lower baffle, both of which are substantially horizontally disposed in the interior of the tank between a level at which the water is tangentially introduced into the flotation tank and the lower level, the upper baffle having a central opening through which water flows downwardly and the second baffle being a substantially circular plate surrounded by a substantially annular opening through which water flows downwardly in the flotation tank, the lower baffle being provided with means for retaining beneath it bubbles created by the introduction of the first and second gases into the flotation tank at the lower level, and the upper baffle being provided with means for retaining beneath it bubbles created by the introduction of the first and second gases into the flotation tank at the lower level, the upper baffle being provided with an upper vent for venting bubbles from beneath the upper baffle to a position adjacent the surface of the water in the flotation tank, the lower baffle being provided with a lower vent for venting bubbles from beneath the lower baffle to a position adjacent the underside of the upper baffle, wherein dissolved oil is removed from said surface, and said contacted water separates into a portion which is substantially free of sand, and a portion containing sand;

introducing a portion of the contacted water, which is substantially free of sand, from the flotation tank, into a vacuum vessel to cause a liberation of a portion of the first and second gases dissolved in the water; and producing a water fraction in the vacuum vessel;

removing the water fraction from the vacuum vessel;

compressing the gases liberated in the vacuum vessel so that increased pressure condenses water out of the liberated gases;

contacting the gases liberated in the vacuum vessel with a desiccant to remove water;

reducing the temperature of the gases liberated in the vacuum vessel after they leave the desiccant until one of the gases liquifies, then separating the liquified gas from remaining gas;

removing sand from the water in the flotation tank by introducing a portion of the contacted water, containing sand, from the flotation tank into a sump tank where the sand accumulates on the bottom;

introducing the first and second gases into the sump tank and contacting it with the sand; and skimming oil from the surface of the water in the sump tank.

* * * * *